(12) United States Patent
Gu et al.

(10) Patent No.: US 7,902,312 B2
(45) Date of Patent: Mar. 8, 2011

(54) MICHAEL ADDITION ADDUCTS AS ADDITIVES FOR PAPER AND PAPERMAKING

(75) Inventors: Qu-Ming Gu, Bear, DE (US); Ronald R. Staib, Hockessin, DE (US)

(73) Assignee: Hercules Incorporated, Wilmington, DE (US)

( * ) Notice: Subject to any disclaimer, the term of this patent is extended or adjusted under 35 U.S.C. 154(b) by 870 days.

(21) Appl. No.: 11/804,360

(22) Filed: May 18, 2007

(65) Prior Publication Data

US 2008/0009596 A1  Jan. 10, 2008

Related U.S. Application Data

(60) Provisional application No. 60/801,566, filed on May 18, 2006.

(51) Int. Cl.
*C08F 26/02* (2006.01)
(52) U.S. Cl. .......................................... 526/310; 526/311
(58) Field of Classification Search .................. 526/310, 526/311
See application file for complete search history.

(56) References Cited

U.S. PATENT DOCUMENTS

| 2,721,140 | A |  | 10/1955 | Weisberger |
| 3,728,215 | A |  | 4/1973 | Espy .............................. 162/167 |
| 4,060,570 | A |  | 11/1977 | Floyd et al. ....................... 260/21 |
| 4,421,602 | A |  | 12/1983 | Brunnmueller et al. ... 162/168.2 |
| 4,774,285 | A |  | 9/1988 | Pfohl ................................. 525/60 |
| 5,292,441 | A |  | 3/1994 | Chen et al. ..................... 210/735 |
| 5,630,907 | A |  | 5/1997 | Nilz et al. ................... 162/168.2 |
| 5,961,782 | A |  | 10/1999 | Luu et al. ....................... 162/111 |
| 5,994,449 | A |  | 11/1999 | Maslanka ...................... 524/503 |
| 6,616,807 | B1 |  | 9/2003 | Dyllick-Brenzinger et al. ............................. 162/175 |
| 6,706,821 | B1 |  | 3/2004 | Letchford ...................... 525/302 |
| 6,797,785 | B1 |  | 9/2004 | Hund et al. ................. 525/328.2 |
| 2003/0092782 | A1 |  | 5/2003 | Goto |
| 2004/0059065 | A1 |  | 3/2004 | Goto |
| 2007/0261807 | A1 | * | 11/2007 | Taggart et al. ................ 162/158 |

FOREIGN PATENT DOCUMENTS

| DE | 199 31 720 | 1/2001 |
| EP | 0 251 182 | 6/1987 |
| EP | 0 251 182 B1 * | 11/1991 |

OTHER PUBLICATIONS

BASF Chemical Company, "Polyvinylamine—BASF Innovations in Chemisrty", Oct. 5, 2002.

* cited by examiner

*Primary Examiner* — Robert D. Harlan
(74) *Attorney, Agent, or Firm* — Joanne Mary Fobare Rossi

(57) ABSTRACT

Several Michael addition adducts of vinylamines with α,β.-unsaturated alkyl carbonyl compounds including amides, esters and acids, particularly acrylamide are presented. Additionally, a process for producing these Michael addition adducts is described. These adducts are generally useful in the manufacture of paper and are particularly useful as dry strength additives to make paperboard products using a papermaking machine.

23 Claims, No Drawings

US 7,902,312 B2

MICHAEL ADDITION ADDUCTS AS ADDITIVES FOR PAPER AND PAPERMAKING

This application claims the benefit of U.S. Provisional Application No. 60/801,566 and filed May 18, 2006.

FIELD OF THE INVENTION

The present invention relates to Michael addition adducts of vinylamines with various compounds having an unsaturated bond conjugated to an electron-withdrawing group, and a process for the production of vinylamine adducts. In particular, the present invention relates to Michael addition adducts of polyvinylamine with $\alpha,\beta$-unsaturated alkyl carbonyl compounds including amides, esters and acids. Furthermore, the invention relates to uses of these adducts as, dry strength additives and/or retention/drainage aids for papermaking.

BACKGROUND OF THE INVENTION

Polyvinylamine has been used in many industrial and pharmaceutical applications. In the papermaking industry, polyvinylamine has been used as dry and/or wet strength additives as well as retention/drainage aids. Polyvinylamine has a linear backbone structure with no branches and possesses one primary amine group for every two carbon units. The polymer is highly cationic in an aqueous system with a broad pH range due to the high density of the primary amine. Thus, it has a strong hydrogen bonding ability, suitable for a variety of industrial applications.

Polyvinylamine has typically been made by free radical polymerization of N-vinylformamide monomer followed by a direct base- or acid-catalyzed hydrolysis by which the primary amine is deprotected and formic acid is released. A partially hydrolyzed and water-soluble homopolymer of N-vinylformamide that contains N-vinylformamide units and vinylamine units has also be prepared, as disclosed in U.S. Pat. No. 4,421,602. U.S. Pat. No. 2,721,140 discloses the use of polyvinylamine as an additive to make papers having high wet strength. U.S. Pat. No. 4,421,602 also disclosed the use of polyvinylamine and a 50% hydrolyzed polyvinylformamide to increase efficiencies of flocculation, retention of fines and drainage rate of pulp fiber in papermaking process. U.S. Pat. No. 5,961,782 discloses the use of polyvinylamine to make crosslinkable creping adhesive formulations. U.S. Pat. No. 6,159,340 disclosed the use in papermaking of polyvinylamine and a 50% hydrolyzed polyvinylformamide as dry and wet strength additives in paper and paperboard production. U.S. Pat. Nos. 6,616,807 and 6,797,785 disclose the use of polyvinylamine as drainage aids, flocculants and retention aids in the paper industry. Despite its unique properties and wide applications of polyvinylamine and its derivatives, other polyvinylamine alternatives are still being sought.

As disclosed in U.S. Pat. No. 4,774,285, N-vinylformamide monomer may be copolymerized with an additional vinyl monomer, e.g., vinyl acetate, followed by a subsequent hydrolysis to produce a water-soluble copolymer of vinylamine and vinyl alcohol. These water-soluble copolymers may be used as wet and dry strength additives for papermaking. Further, U.S. Pat. No. 5,630,907 disclosed copolymer compositions containing vinylamine units and acrylic acid units, and their applications. U.S. Pat. No. 6,797,785 disclosed copolymer compositions containing vinylamine units and diallyldimethylammonium (chloride) ("DADMAC") units or acrylamide units via reverse emulsion polymerization, and the uses of those copolymers as flocculants and coagulants for the papermaking industry. EP 0251182 disclosed a copolymer that contains vinylamine units and acrylonitrile units for use in papermaking as drainage, retention agents, and as a wet end additive to increase dry strength resin of paper products. In general, those copolymer compositions contain vinylamine units and an additional vinyl units linked together randomly through C—C bond in a linear fashion, and those compositions reduce the density of vinylamine units in the polymer backbone, thereby giving it a lower cationic charge density as compared to polyvinylamine.

The derivatization of polyvinylamine by modifying the primary amines is an alternative approach to produce polyvinylamine analogs with altered physical and application properties. For example, U.S. Pat. No. 5,292,441 disclosed the use of quaternized polyvinylamines as flocculants for wastewater clarification and the quaternized polyvinylamines are obtained from the reaction of a polyvinylamine with a quaternizing agent such as methyl chloride, dimethyl sulfate or benzyl chloride. U.S. Pat. No. 5,994,449 disclosed a resin composition that is a reaction product of epihalohydrin with a mixture of a poly(vinylamine-co-vinyl alcohol) copolymer and a polyaminoamide and use of this composition as a creping adhesive.

The present invention is directed to modification of polyvinylamine through a Michael addition reaction. Michael addition is a chemical reaction that involves a conjugate addition of a nucleophile to an $\alpha,\beta$-unsaturated bond conjugated to an electron-withdrawing group, particularly $\alpha,\beta$-unsaturated carbonyl compounds resulting in a chain-extended product. One interesting advantage of this addition reaction is that there are no by-products released by the reaction. As a result, the Michael addition reaction has been widely used in organic synthesis and also applied to polymer chemistry on many occasions.

SUMMARY OF THE INVENTION

This invention relates to a Michael addition product of vinylamine, such as a vinylamine homopolymer (polyvinylamine), a vinylamine copolymer or a vinylamine terpolymer with a compound that has an $\alpha,\beta$-unsaturated bond conjugated to an electron withdrawing group, particularly with an $\alpha,\beta$-unsaturated alkyl carbonyl compound. In this composition, the unsaturated alkyl carbonyl compound is appended onto the vinylamine backbone through a nucleophilic addition of the primary amines of vinylamine, preferably polyvinylamine to the unsaturated moiety to form N—C linkages, wherein the unsaturated double bond subsequently becomes saturated.

Generally the invention relates to a Michael addition adduct having the general formula:

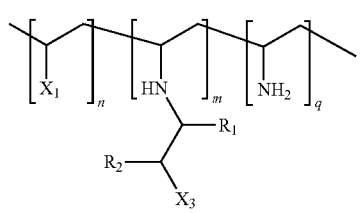

wherein
X$_1$ is selected from the group consisting of carboxyl, carboxamide, hydroxyl, alkylamine, alkanoxyl, alkenyl, alkyenyl, nitro and cyano groups and $X_2$ comprises any electron-withdrawing group or amine, $R_1$ and $R_2$ may be the same or different and are selected from the group consisting of H, alkyl, alkenyl, alkyenyl, carbonyl, carboxyl, and carboxamide groups, m, n and q are positive integers, representing numbers of its repeating unit distributed in the polymer in a random fashion, m+q ranges from 2,000 to 20,000, m/(m+q) ranges from $2/100$ to $95/100$ and n is a positive integer between 0 to 18,000. When n equals to 0, the polymer used for Michael addition is polyvinylamine homopolymer.

Specifically, acrylamide or dimethyl maleate is added to vinylamine by Michael addition at various molar ratios of the added compound to the vinylamine based on its repeating units. In the case of polyvinylamine, all the repeating units of polyvinylamine have small molecular weights at 43 with one primary amine. Adding one compound to each of the repeating units increases the total weight of polyvinylamine but has little effect on the physical size and molecular structure of the polymer in an aqueous medium. After the addition reaction, many, if not all, of the primary amines of polyvinylamine are converted to secondary amines depending on the molar ratio of the added compound to the repeating unit. When acrylamide is used, 3-alkylamino-propionamide functional groups are formed and branched out from the linear backbone of the polymer. The branched amide group changes the physical properties of polyvinylamine in aqueous medium and enhances intermolecular and intramolecular interactions, and reduces its binding ability to water. Chemically, the primary amine is converted to a secondary amine, which lowers the cationic charge density of the polymer. Practically, these changes in physical and chemical properties ultimately affect application properties, such as bonding affinity to pulp fiber, crosslinking ability, and interactions with other polymers etc.

Michael addition reaction of vinylamines is generally conducted in a reaction media, typically in water, at the solids content of the vinylamine at about 10-20%. The addition reaction is carried out under alkaline conditions where the amine is free and available for the reaction. The reaction is generally performed at an elevated temperature for about 2-5 hours without using any catalysts.

Michael addition adducts of vinylamine with acrylamide or dimethyl maleate, when used as papermaking additives, provide improved or equivalent dry strength relative to polyvinylamine to the paper products made using a paper machine. The materials are effective at the treatment level from about 0.01% to about 0.5% based on the dry pulp. The products also give good drainage and retention properties to the pulp fiber.

The compositions of the present invention, most broadly, can be made by adding a compound having an α,β-unsaturated bond conjugated to an electron-withdrawing group to the amine group of a vinylamine, such as a vinylamine homopolymer (polyvinylamine), a vinylamine copolymer or a vinylamine terpolymer, preferably a polyvinylamine. The composition comprises repeating units having a general formula in Formula A, wherein $R_1$ and $R_2$ is H, any alkyl, alkenyl, alkyenyl, carbonyl, carboxyl, or carboxamide, Y is carbonyl, carboxyl, carboxamide, sulphonamide, sulphonimide, sulphonyl, or phosphonyl group, $R_3$ is H, OH, $NH_2$, SH and any short chain ($C_1$-$C_5$) and long chain ($C_6$-$C_{22}$) alkyl group, Z is nitro, cyano, or other electron-withdrawing groups as known to the art, $X_1$ is as stated above, q and m represent the repeating units of vinylamine and the repeating units of the reacted vinylamine, respectively, and the total q+m or r is any number between about 2,000 to about 20,000, m/(m+q) is about $2/100$ to about $95/100$; n is a positive integer between 0 to 18,000. When n equals to 0, the polymer used for Michael addition is polyvinylamine homopolymer.

Most preferably, however, is the Michael adduct composition of polyvinylamine with a compound having a conjugated double bond conjugated to a carbonyl group, as indicated in general formula A wherein $R_1$ is H, carboxylic acid, carboxylate methyl ester, $R_2$ is H, or methyl, Y is carboxamide or carbonyl, $R_3$ is H, $NH_2$ or OH, m+q, is any number between about 2000 to about 10,000 and m/(m+q) is about $1/20$ to about $95/100$; n is 0.

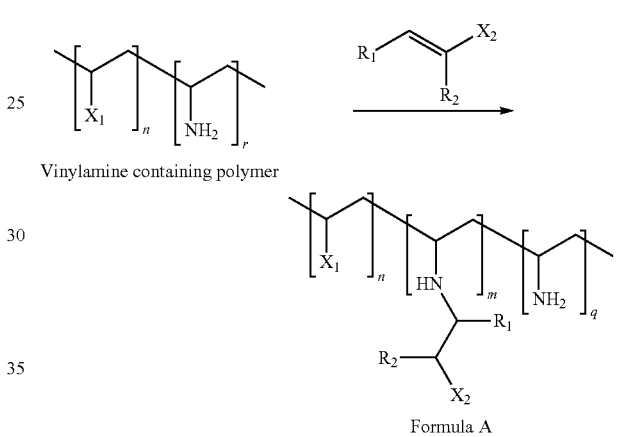

Vinylamine containing polymer

Formula A

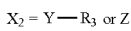

In a preferred group of compositions within the invention, acrylamide is used for the addition reaction. The molar ratio of acrylamide to the repeating vinylamine units is preferably greater than about 0.05 but less than about 1. When the molar ratio is about 1, all the primary amines of vinylamine become reacted with acrylamide. At least one repeating vinylamine unit reacts with acrylamide or another compound having α,β-unsaturated group conjugated to an electron-withdrawing group to form the structure as indicated in the general formula A. More preferably, the molar ratio of acrylamide to the repeating vinylamine units in polyvinylamine is greater than about 0.2 to less than about 0.9. Most preferably, the molar ratio of acrylamide to the repeating unit is about 0.67 at which ratio the new composition provided the desired application property for the paperboard product.

Sometimes, it is desirable to react further the Michael addition adduct to produce polyvinylamine derivative with additional functionalities as shown in the following reaction scheme. As a representative example, the Michael addition adduct in Formula B, wherein $R_1$ is H or $COOCH_3$, $R_2$ is H or methyl, and $R_4$ is $OCH_3$ or $NH_2$, can be further hydrolyzed under acid or basic condition, partly or completely, to produce amphoteric polymer compositions as showed in the Formula B wherein $R_1$ is H or COOH, $R_2$ is H or methyl, and $R_4$ is OH.

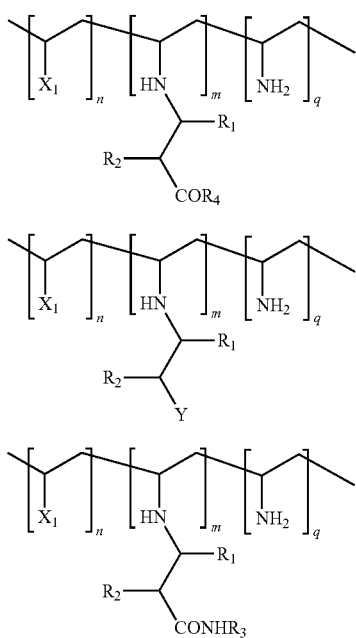

Formula B

Formula C

Formula D

Also, the Michael addition of polyvinylamine with a compound having a carboxamide group (e.g., acrylamide) can be converted to a new composition through a Hoffmann Rearrangement using sodium hyperhalide under alkaline conditions. The new polymer has a general formula in Formula C wherein $R_1$ is H or an alkyl group, $R_2$ is H or methyl, and Y is $NH_2$. In this approach, additional primary amino groups are created and extended from the polyvinylamine backbone.

Furthermore, the Michael addition adduct of vinylamine with acrylamide can react with an aldehyde or a dialdehyde to produce a modified polyvinylamine with N-(1-substituted hydroxylmethylene) propionamide groups branched out from the amine groups. This type of novel polymers has a general formula in Formula D wherein $R_3$ is H or $CHOHR_4$ and $R_4$ is CHO or any alkyl group or substituted alkyl group, and $R_2$ is H or methyl. When a dialdehyde compound, such as glyoxal, is used, a reactive functional group is introduced to the Michael adduct of vinylamide with acrylamide. The glyoxalated Michael adduct may be used as a temporary wet strength material or an enhanced dry strength additive for papermaking uses.

Specifically, acrylamide or dimethyl maleate is added to vinylamine by Michael addition at various molar ratios of the added compound to the vinylamine based on its repeating units. In the case of polyvinylamine, all the repeating units of polyvinylamine have small molecular weights at 43 with one primary amine. Adding one compound to each of the repeating units increases the total weight of polyvinylamine but has little effect on the physical size and molecular structure of the polymer in an aqueous medium. After the addition reaction, many, if not all, of the primary amines of polyvinylamine are converted to secondary amines depending on the molar ratio of the added compound to the repeating unit. When acrylamide is used, 3-alkylamino-propionamide functional groups are formed and branched out from the linear backbone of the polymer. The branched amide group changes the physical properties of polyvinylamine in aqueous medium and enhances intermolecular and intramolecular interactions, and reduces its binding ability to water. Chemically, the primary amine is converted to a secondary amine, which lowers the cationic charge density of the polymer. Practically, these changes in physical and chemical properties ultimately affect application properties, such as bonding affinity to pulp fiber, crosslinking ability, and interactions with other polymers etc.

Michael addition reaction of vinylamines is generally conducted in a reaction media, typically in water, at the solids content of the vinylamine at about 10-20%. The addition reaction is carried out under alkaline conditions where the amine is free and available for the reaction. The reaction is generally performed at an elevated temperature for about 2-5 hours without using any catalysts.

Michael addition adducts of vinylamine with acrylamide or dimethyl maleate, when used as papermaking additives, provide improved or equivalent dry strength relative to polyvinylamine to the paper products made using a paper machine. The materials are effective at the treatment level from about 0.01% to about 0.5% based on the dry pulp. The products also give good drainage and retention properties to the pulp fiber.

DETAILED DESCRIPTION OF THE INVENTION

The compositions of the present invention, can be made by adding a compound having an $\alpha,\beta$-unsaturated bond conjugated to an electron-withdrawing group to the amine group of a vinylamine, such as a vinylamine homopolymer (polyvinylamine), a vinylamine copolymer or a vinylamine terpolymer, preferably a polyvinylamine. The composition comprises repeating units having a general formula in Formula A, wherein $R_1$ and $R_2$ is hydrogen or any alkyl, alkenyl, alkyenyl, carbonyl, carboxyl, or carboxamide, Y is carbonyl, carboxyl, carboxamide, sulphonamide, sulphonimide, sulphonyl, or phosphonyl group, $R_3$ is H, OH, $NH_2$, SH and any short chain ($C_1$-$C_5$) and long chain ($C_6$-$C_{22}$) alkyl group, Z is nitro, cyano, or other electron-withdrawing groups as known to the art, m and n represents the repeating units of vinylamine and the repeating units of the reacted vinylamine, respectively, and the total n+m is any number between about 2,000 to about 20,000, n/(m+n) is about $2/100$ to about $95/100$.

Most preferable, however, is the Michael adduct composition of polyvinylamine with a compound having a conjugated double bond conjugated to a carbonyl group, as indicated in general formula A wherein $R_1$ is H, carboxylic acid, carboxylate methyl ester, $R_2$ is H, or methyl, Y is carboxamide or carbonyl, $R_3$ is H, $NH_2$ or OH, m+n, is any number between about 2000 to about 10,000 and n/(m+n) is about $1/20$ to about $95/100$; x1 is as above; n is a m/m+

In a preferred group of compositions within the invention, acrylamide is used for the addition reaction. The molar ratio of acrylamide to the repeating vinylamine units is preferably greater than about 0.05 but less than about 1. When the molar ratio is about 1, all the primary amines of vinylamine become reacted with acrylamide. At least one repeating vinylamine unit reacts with acrylamide or another compound having $\alpha,\beta$-unsaturated group conjugated to an electron-withdrawing group to form the structure as indicated in the general formula A. More preferably, the molar ratio of acrylamide to the repeating vinylamine units in polyvinylamine is greater than about 0.2 to less than about 0.9. Most preferably, the molar ratio of acrylamide to the repeating unit is about 0.67 at which ratio the new composition provided the desired application property for the paperboard product.

Sometimes, it is desirable to react further the Michael addition adduct to produce polyvinylamine derivative with additional functionalities as shown in the following reaction scheme. As a representative example, the Michael addition adduct in Formula B, wherein $R_1$ is H or $COOCH_3$, $R_2$ is H or methyl, and $R_4$ is $OCH_3$ or $NH_2$, can be further hydrolyzed under acid or basic condition, partly or completely, to produce amphoteric polymer compositions as showed in the Formula B wherein $R_1$ is H or COOH, $R_2$ is H or methyl, and $R_4$ is OH.

Also, the Michael addition of polyvinylamine with a compound having a carboxamide group (e.g., acrylamide) can be converted to a new composition through a Hoffmann Rearrangement using sodium hyperhalide under alkaline conditions. This polymer has a general formula shown in Formula C wherein $R_1$ is H or an alkyl group, $R_2$ is H or methyl, and Y is $NH_2$. In this approach, additional primary amino groups are created and extended from the polyvinylamine backbone.

Furthermore, the Michael addition adduct of vinylamine with acrylamide can react with an aldehyde or a dialdehyde to produce a modified polyvinylamine with N-(1-substituted hydroxylmethylene) propionamide groups branched out from the amine groups. This type of novel polymers has a general formula in Formula D wherein $R_3$ is H or $CHOHR_4$ and $R_4$ is CHO or any alkyl group or substituted alkyl group, and $R_2$ is H or methyl. When a dialdehyde compound, such as glyoxal, is used, a reactive functional group is introduced to the Michael adduct of vinylamine with acrylamide. The glyoxalated Michael adduct may be used as a temporary wet strength material or an enhanced dry strength additive for papermaking uses.

The synthesis to produce the Michael addition adduct of vinylamine polymer with acrylamide for example is typically performed in water, however, it may also utilize an organic solvent or may be performed neat. The adduct products can be obtained with or without purification. In general, the acrylamide is added gradually to a vinylamine aqueous solution, preferably a polyvinylamine aqueous solution, at about 30° C. to about 50° C. at pH of about 9.0 to about 11.0 over about 20-30 minutes. After the addition, the reaction can be conducted in a pH, preferably, ranged from about 7 to about 14, more preferably at about 9.0 to about 12.0, and most preferably at about 11.0 to about 11.5, at a reaction temperature, preferably in the range of about 10° C. to about 90° C., more preferably at about 30° C. to about 80° C., and most preferably about 50° C. to about 70° C., for a time sufficient to complete reaction, generally about 15 minutes to about 12 hours, more preferably about 1 hour to about 8 hours, and most preferably about 3 to about 5 hours. The reaction can be enhanced at the elevated temperature. However, care must be taken to prevent acrylamide from being hydrolyzed to acrylic acid at a high temperature under strong alkaline conditions before it reacts with the amine. The double bond of acrylic acid has little reactivity to the amine nucleophile because ionization of the carboxylic acid under alkaline pH stabilizes the conjugated double bond.

In general, the molecular weight of vinylamine polymer has little effect on the reaction efficiency of Michael addition reaction. To produce the Michael addition adducts for papermaking uses, the molecular weight of vinylamine is preferably in the range of about 10,000 to about 1,000,000 Daltons, more preferably in the range of about 50,000 to about 500,000 Daltons, and most preferably in the range of about 200,000 to about 400,000 Daltons. The reaction is preferably performed at about 1% to about 50% solids in water, more preferably at about 5% to about 25%, and most preferably at about 10% to about 20%.

The molecular weight of Michael addition adducts of the present invention are important for their use in papermaking as strength additives. In a preferred group of compositions within the invention where acrylamide is used for the addition reaction, the molecular weight ($M_w$) of the product is preferably in the range of about 100,000 to about 1,000,000 Daltons, more preferably in the range of from about 200,000 to about 600,000 Daltons, and most preferably in the range of from about 250,000 to about 450,000 Daltons. In this preferable molecular weight range, the Michael addition adducts are low enough as not to bridge between molecules to cause flocculation of the adduct but high enough to retain on the pulp fibers.

Typically, the addition of acrylamide onto the primary amine of vinylamine is conducted in water with about 12% solids of the vinylamine. The viscosity of the product is reduced from about 2020 cps at about 12% solids to 460 cps at about 15% solids after the Michael addition. This significant decrease in viscosity is caused by the enhanced intermolecular and intramolecular interactions of the Michael adduct and therefore reduced water binding ability of the secondary amine, relative to the primary amine of the unreacted polyvinylamine. The composition of the adduct has been confirmed by $^1$H— and $^{13}$C-NMR analyses. $^1$H-NMR spectrum of the final product displays two new and broad signals at 2.3 and 2.8 ppm, representing the saturated ethylene protons of N-propionamide. No proton signal is observed in the region of 5.5-6.5 ppm, suggesting that all the acrylamide has been covalently appended to the amine groups of the vinylamine polymer. $^{13}$C-NMR analysis showed one single peak at 180 ppm, indicating a saturated amide carbon. Liquid chromatographic analysis of the acrylamide monomer shows 30-70 ppm of the residual acrylamide that can be completely decomposed by treating the final product with 1-5% sodium metabisulfite. At pH 7.0, the charge density of the Michael addition adduct is 4.7 meq/g while the unreacted vinylamine is at 10.0 meq/g at pH 7.0. The result also suggests that the primary amines in vinylamine have been modified.

Brookfield viscosity (BV) is measured using a DV-II Viscometer (Brookfield Viscosity Lab, Middleboro, Mass.). A selected spindle (number 27) is attached to the instrument, which is set for a speed of 30 RPM. The reaction solution is prepared at a certain solid content. The Brookfield viscosity spindle is carefully inserted to the solution so as not to trap any air bubbles and then rotated at the above-mentioned speed for 3 minutes at 24° C. The units are centipoises.

In order to obtain a molecular weight measurement of the Michael addition adducts described herein gel permeation chromatography was used. The analysis was accomplished by the use of gel permeation columns (CATSEC 4000+1000+ 300+100) using Waters 515 series chromatographic equipment with a mixture of solution (1% NaNO3/0.1% trifluoroacetic acid in 50:50 H2O:acetonitrile) as the mobile phase with a flow rate at 1.0 ml/min. The detector was a Hewlett Packard 1047A differential refractometer. The column temperature is set at 40° C. and the detector temperature is at 35° C. The molecular weight average was calculated against commercial and narrow mw standard poly(2-vinyl pyridine). Estimates of the number average (Mn) and weight average molecular weight (Mw) of the product mixtures were then computer-generated.

The Michael addition adducts of vinylamine can be produced with a wide range of compounds having unsaturated bond conjugated to an electron-withdrawing group. Examples of the suitable and preferred compounds contemplated include, but are not limited to, acrylamide, N-alkylacrylamide, methacrylamide, N-alkylmethacrylamide, N-(2-methylpropanesulfonic acid)acrylamide, N-(glycolic acid)acrylamide, N-[3-(propyl)trimethylammonium chloride]acrylamide, acrylonitrile, acrolein, methyl acrylate, alkyl acrylate, methyl methacrylate, alkyl methacrylate, aryl acrylate, aryl methacrylates, [2-(methacryloyloxy)ethyl]-trimethylammonium chloride, N-[3-(dimethylamino)propyl] methacrylamide, N-ethylacrylamide, 2-hydroxyethyl acrylate, 3-sulfopropyl acrylate, 2-hydroxyethyl methacrylate, glycidyl methacrylate, pentafluorophenyl acrylate, ethylene diacrylate, ethylene dimethacrylate heptafluorobuty-I acrylate, poly(methyl methacrylate), acryloylmorpholine, 3-(acryloyloxy)-2-hydroxyypropyl methacrylate, dialkyl maleate, dialkyl itaconate, dialkyl fumarate, 2-cyanoethyl acrylate, carboxyethyl acrylate, phenylthioethyl acrylate, 1-adamantyl methacrylate, dimethylaminoneopentyl acrylate, 2-(4-benzoyl-3-hydroxyphenoxy)ethyl acrylate, and dimethylaminoethyl methacrylate.

The Michael addition adducts described herein can be used in numerous applications depending on the nature of the electron withdrawing group of the added compounds. Adducts made with acrylamide can be used as dry or wet strength resin because the additional amide groups enhance inter- or intra-molecular interactions. The amide group added can be further hydrolyzed to a carboxylic acid or converted to a primary amide via Hoffmann Rearrangement. Adducts which contain carboxylic acids, obtained through hydrolysis of the propionamide groups, have amphoteric structures and can also be used, for example, as strength additives or retention and drainage aids in papermaking industry, and as flocculants for water treatment. Adducts which contain ethylamine groups, obtained through Hoffmann Rearrangement can also be used as strength additives, retention/drainage aids, and coagulants in water treatment and many other similar industrial applications.

A difunctional or multi-functional $\alpha,\beta$-unsaturated carbonyl compound can be used to crosslink vinylamine through a Michael addition reaction. The examples of those difunctional or multi-functional compounds are: ethylene glycol diacrylate, methylenebisacrylamide, 1,4-butanediol diacrylate, bisphenol diacrylate, polyethylene glycol diacrylate, hexanediol diacrylate, 1,10-decanediol diacrylate, dicyclopentenyl acrylate, dicyclopentenyl methacrylate, carboxyethyl acrylate, polyethoxy methacrylatemethacrylate, phenylthioethyl acrylate, 1-adamantyl methacrylate, dimethylaminoneopentyl acrylate, 2-(4-benzoyl-3-hydroxyphenoxy)ethyl acrylate, dimethylaminoethyl methacrylate, polyfunctional acrylamide, polyfunctional acrylates, polyfunctional methacrylates, polyfunctional maleates, and polyfunctional fumarates. The crosslinked adducts can be used as strength additive, retention aid in papermaking, or as adhesive for construction uses, plasticizers or modifiers for optimizing resin properties.

N-(Long chain alkyl)acrylamide or any $\alpha,\beta$-unsaturated carbonyl compound having a hydrophobic functional group can be added to vinylamine through Michael addition to produce a hydrophobically modified vinylamine derivative. The hydrophobic adducts can be used as retention aids, deposit control agents in papermaking process, flocculants in wastewater treatment, plasticizers, viscosifiers, and coating materials for various industrial applications.

Above mentioned compounds containing $\alpha,\beta$ unsaturated alkyl carbonyl groups can be also added to the primary amine of a copolymer or terpolymer of vinylamine with other monomers through Michael addition. Other primary amine-containing polymers such as polyethylenimine (PEI) can also be applied to the Michael addition reaction disclosed in this invention using the above mentioned compounds with $\alpha,\beta$-unsaturated alkyl carbonyl groups.

In a preferred group of compositions, the Michael addition adducts of polyvinylamine with acrylamide and/or dimethyl maleate are used as dry strength additive for paper products and to accelerate drainage of the pulp fiber and to increase the retention of fines and fillers by the pulp fibers during the papermaking process.

It is preferable that the Michael addition adducts of the present invention contain at least 2% (on molar basis) unreacted primary amine remained on the polymer backbone so as to be effective cationic polymers for various applications including papermaking uses. While not wishing to be bound by theory, it is believed that the unreacted primary amines distributed evenly along the polymer backbone, balance the secondary amine formed by the Michael addition reaction thereby providing effective interactions with pulp fibers through multiply hydrogen bond and charge interactions The embodiments of the invention are defined in the following Examples. It should be understood that these Examples are given by way of illustration only. Thus various modifications of the present invention in addition to those shown and described herein will be apparent to those skilled in the art from the foregoing description. Although the invention has been described with reference to particular means, materials and embodiments, it is to be understood that the invention is not limited to the particulars disclosed, and extends to all equivalents within the scope of the appended claims. In the following Examples, all parts and percentages are by weight, unless otherwise indicated.

EXAMPLES

Example 1

Polyvinylamine Acrylamide Michael Addition Adduct

A polyvinylamine solution (Hercobond® 6363 dry strength resin, 1000 g, 12% active solids, available from Hercules Incorporated) was added to a 2 L-reaction flask and was adjusted to pH 11.3-11.5 using 50% NaOH. Acrylamide solution (160 g, 50%) was added dropwise at room temperature for 20 minutes while the temperature of the reactants gradually increased to 40-45° C. The resulting mixture was stirred at 70° C. for 5 hours and the pH of the reaction mixture was maintained at 11.0-11.5 using 50% NaOH. The reaction mixture was then cooled down to 25-30° C. and the pH was adjusted to 8.0-9.0 using a concentrated HCl. To the resulting solution was added sodium metabisulfite (1 g). The mixture was stirred for 10 minutes at room temperature. The resultant product had 15.2% solids, pH 8.5, 460 cps Brookfield viscosity. The residual acrylamide was not detected by a standard liquid chromatographic method specifically designed for monomer analysis. The charge density of the polymer was measured to be 4.7 meq/g (pH 7.0). The structure was confirmed with $^1$H and $^{13}$C-NMR analysis and the molar ratio of vinylamine units to the added acrylamide was determined to be 60 to 40 based on the integration of $^1$H-NMR. $^1$H-NMR (D$_2$O, 300 Hz) ppm 2.50-3.10 (broad, 3HX1.2, —CH—N— and —N—CH2-C—CON—), 2.20-2.40 (broad, 2HX0.66, C—N—C—CH2-CON—), 1.20-1.85 (broad, 2H, backbone methylene —CH2-); 13C-NMR (D2O, 75.5 Hz): ppm 180 (—CONH—), 55 (backbone —C—NH—), 48 (backbone —C—NH2), 44 (backbone methylene), 37 (ethylene of N-propionamide).

Example 2

Amphoteric Polyvinylamine Propionic Acid Using Acrylamide

A polyvinylamine solution (Hercobond® 6363 dry strength resin, 500 g, 12% active solids, available from Hercules Incorporated) was added to a 1 L-reaction flask and adjusted to pH 11.3-11.5 using 50% NaOH. Acrylamide solution (80 g, 50%) was added dropwise at room temperature for 20 minutes while the temperature of the reactants gradually increased to 40° C. The resulting mixture was stirred at 70° C. for 5 hours and the pH of the reaction mixture was maintained at 11.0-11.5 using 50% NaOH. To the reactants was added NaOH solution (50%, 9 g). The resulting mixture was stirred at 75° C. for 3 hours and water was added to reduce viscosity of the materials at different times. The material was then cooled down to 25-30° C. and the pH was adjusted to 8.0-9.0 using concentrated HCl. The product had 12.2% solids. The structure was confirmed by 13C-NMR analysis and the ratio of the vinylamine units in polyvinylamine, acrylamide and acrylic acid to be 60:32:8. 13C-NMR (D2O, 75.5 Hz): the integrated ratio of ppm 180 (—CONH—) and ppm 183 (—COOH—) equals to 4:1.

Example 3

Michael Addition Adduct of Polyvinylamine Using Dimethyl Maleate and Acrylamide

A polyvinylamine solution (Hercobond® 6363 dry strength resin, 500 g, 12% active solids, available from Hercules Incorporated) was added to a 1 L-reaction flask and adjusted to pH 9.5 using 50% NaOH. Dimethyl maleate (11 g) was added dropwise at room temperature in 10 minutes followed by the addition of acrylamide (50%, 76 g). The resulting mixture was stirred at 24° C. for 1 hour and the pH of the reaction mixture was adjusted to 11.2-11.5 by adding 25 g 50% NaOH. The resulting mixture was stirred at 50° C. for 3 hours and 70° C. for 2 hours and water was added to reduce viscosity of the materials at different times. After cooling down, the pH was adjusted to 9.0 to give the product having 12.3% solids. The ratio of the vinylamine unit in polyvinylamine, maleic acid and acrylamide was determined to be 50:15:35.

Example 4

Michael Addition Adduct of Polyvinylamine Using Dimethyl Maleate and Acrylamide

A polyvinylamine solution (Hercobond® 6363, 500 g, 12% active solids) was added to a 1 L-reaction flask and adjusted to pH 9.5 using 50% NaOH. Dimethyl maleate (30 g) was added dropwise at room temperature in 10 minutes followed by the addition of acrylamide (50%, 60 g). The resulting mixture was stirred at 24° C. for 1 hour and the pH of the reaction mixture was adjusted to 11.2-11.5 by adding 25 g 50% NaOH. The resulting mixture was stirred at 50° C. for 3 hours and 70° C. for 2 hours and water was added to reduce viscosity of the materials at different times. After cooling down, the pH was adjusted to 9.0 to give the product having 5.5% solids. The ratio of the vinylamine unit in polyvinylamine, maleic acid and acrylamide was determined to be 50:25:25.

Example 5

Michael Addition Adduct of Polyvinylamine with Methyl Acrylate and a Hydrolyzed Product A polyvinylamine solution (Hercobond® 6363 dry strength resin, 100 g, 12% active solids, available from Hercules Incorporated) was added to a 250 ml-reaction flask is adjusted to pH 9.5 using 50% NaOH. Methyl acrylate (6 g) was added dropwise at room temperature in 20 minutes while the pH was maintained at 9.0-9.5. The resulting mixture was stirred at 24° C., pH 9.5 for 2 hour and the pH of the reaction mixture was adjusted to 11.0 using the 50% NaOH solution. The resulting mixture was stirred at 50° C. for 3 hours. After cooling down, the pH was adjusted to 9.0.

Example 6

Chemical and Physical Properties of the Adducts

The four Michael addition adducts were synthesized as described in Examples 1-4. In the first three cases (see Table I below), viscosities of the adducts decrease as compared to the starting polyvinylamine. However, the adduct's viscosity in Example 4 was the only one that increases. The viscosities remain substantially unchanged after 30 days at pH of about 8 to 11. The charge densities of the adducts decrease and varies with the added functional group and depending on whether the product was amphoteric or cationic. The residual acrylamide of the adducts was 30-70 ppm but was undetected after treating the final product with 1% $N_2S_2O_5$.

TABLE I

Chemical and Physical Properties of the Adducts

| | Structure based on Formula A | Chemical composition | BV (5%) (cPs) | Charge density (pH = 7) | Residual Acrylamide (ppm) |
|---|---|---|---|---|---|
| Example 1 | $R_1, R_2$=H, X=$CONH_2$ | cationic | 22 | 4.7 | 32 |
| Example 2 | $R_1, R_2$=H, X=COOH or CONH2 | amphoteric | 22 | 2.6 | 97 |
| Example 3 | $R_1$=COOH or H, $R_2$=H, X=COOH or $CONH_2$ | amphoteric | 43 | 2.2 | 78 |
| Example 4 | $R_1$=COOH or H, $R_2$=H, X=COOH or $CONH_2$ | amphoteric | 156 | −0.48 | 143 |
| Hercobond ® 6363 | | cationic | 70 | 8.2 | None |

Example 7

Evaluations for Papermaking Application

Dry strengths of papers made from the Michael addition adducts of polyvinylamine prepared in above examples were compared with dry strengths of paper made with benchmark products Hercobond® 6363 dry strength resin(polyvinylamine), available from Hercules Incorporated and Hercobond® 6350 dry strength resin(a homopolymer of N-vinylformamide containing 50% N-vinylformamide and 50% polyvinylamine, available from Hercules Incorporated). Furthermore, the dry strengths were compared to papers with no strength additive (blank).

The linerboard paper was made using a papermaking machine. The paper pulp was a 100% recycled medium, JSSC/JAX, with 50 ppm hardness, 25 ppm alkalinity, 2.5% GPC D15F and 1996 uS/cm conductivity. The system pH was 7.0 and the pulp freeness was 351 CSF with the stock temperature at 52° C. The basis weight was 100 lbs/ream (24× 36-500). The Michael addition adducts functioning as dry strength agents were added to the wet end of the papermaking machine at the level of 0.1 wt % vs. dry paper pulp. The paper was cured at 80° C. for 0.5 hr. Dry tensile strength, dry stretch, dry tear, ring crush, and Mullen burst were used to measure the dry strength effects.

The dry strength test results are shown below in Table II. The performance of the resin compositions was expressed as a percentage increase over the dry strength of paper made without additives.

TABLE II

Dry strength Results of the Examples

| | Dry Tensile | Dry Stretch | Dry Tear | Mullen Burst | Ring Crush |
|---|---|---|---|---|---|
| Example 1 | 108 | 106 | 120 | 111 | 111 |
| Example 2 | 101 | 100 | 106 | 107 | 103 |
| Example 3 | 102 | 103 | 108 | 109 | 103 |
| Example 4 | 104 | 110 | 119 | 113 | 105 |
| Hercobond ® 6363 | 107 | 100 | 111 | 110 | 108 |
| Hercobond ® 6350 | 106 | 103 | 112 | 120 | 110 |

Drainage efficiency and flocculants properties of the polyvinylamine adducts are also compared with Hercobond®6363 and Hercobond® 6350 dry strength resins and the blank using the Canada Freeness Test Method. The turbidities of the filtrates were also measured to estimate flocculation property of the polymers. The evaluation results are summarized in Table III.

TABLE III

Drainage and Flocculation Results of the Examples

| | Turbidity | Freeness | Drainage over blank (%) |
|---|---|---|---|
| Blank | 57 | 409 | 100 |
| Example 1 | 42 | 447 | 109 |
| Example 2 | 50 | 443 | 108 |
| Example 3 | 51 | 429 | 105 |
| Example 4 | 48 | 454 | 110 |
| Hercobond ® 6363 | 45 | 476 | 117 |
| Hercobond ® 6350 | 46 | 450 | 110 |

We claim:
1. A Michael addition adduct comprising the formula:

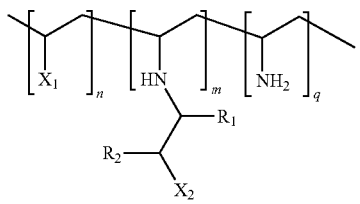

wherein $X_1$ is selected from the group consisting of carboxyl, carboxamide, hydroxyl, amine, alkylamine, alkanoxyl, alkenyl, alkyenyl, nitro and cyano groups and $X_2$ comprises any electron-withdrawing group or amine, $R_1$ and $R_2$ may be the same or different and are selected from the group consisting of H, alkyl, alkenyl, alkyenyl, carbonyl, carboxyl, and carboxamide groups, m and n and q are positive integers, representing numbers of its repeating unit distributed in the polymer in a random fashion, m+q ranges from 2,000 to 20,000, m/(m+q) ranges from 2/100 to 95/100 and n is a positive integer between 0 to 18,000.

2. The Michael addition adduct of claim 1 wherein $X_2$ may be selected from the group consisting of carboxamide, amine, acetoxyl, alkenyl, alkyenyl, nitro and cyano groups.

3. The Michael addition adduct of claim 1 wherein $X_2$ further comprises the formula:

$$Y-R_3$$

wherein Y is selected from the group consisting of carboxamide, sulphonamide, sulphonimide, sulphonyl, phosphonyl and NH groups and wherein $R_3$ is selected from the group consisting of H, OH, $NH_2$, SH, short chain ($C_1$-$C_5$) alkyl and long chain ($C_6$-$C_{22}$) alkyl groups.

4. The Michael addition adduct of claim 3 wherein Y is CONH group, $R_3$ is CHOHCHO or H.

5. The Michael addition adduct of claim 3, wherein $R_1$ and $R_2$ is selected from the group consisting of H, methyl and carboxyl, Y is carboxamide, $R_3$ is selected from the group consisting of H, OH, and methyl, m+n ranges from 1,000 to 10,000 and n/(m+n) ranges from 2/10 to 8/10.

6. The Michael addition adduct of claim 5, wherein $R_1$ is H or carboxyl, $R_2$ is H, m+n ranges from 1,500 to 7,000 and n/(m+n) ranges from 2/10 to 8/10.

7. A process of producing a Michael addition adduct comprising the steps of
a) obtaining a vinylamine,
b) dissolving the vinylamine in a reaction medium,
c) reacting for a period of 2-5 hours the dissolved vinylamine under alkaline conditions at a reaction temperature of 10° C.-90° C. with a compound having at least one unsaturated bond conjugated to an electron-withdrawing group to produce the Michael addition adduct, and
wherein the Michael addition adduct comprises the formula:

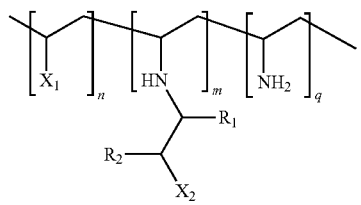

wherein $X_1$ is selected from the group consisting of carboxyl, carboxamide, hydroxyl, amine, alkylamine, alkanoxyl, alkenyl, alkyenyl, nitro and cyano groups and $X_2$ comprises any electron-withdrawing group or amine, $R_1$ and $R_2$ may be the same or different and are selected from the group consisting of H, alkyl, alkenyl, alkyenyl, carbonyl, carboxyl, and carboxamide groups, m and n and q are positive integers, representing numbers of its repeating unit distributed in the polymer in a random fashion, m+q ranges from 2,000 to 20,000, m/(m+q) ranges from 2/100 to 95/100 and n is a positive integer between 0 to 18,000; and wherein the compound having unsaturated bond conjugated to an electron-withdrawing group is selected from the group consisting of acrylamide, N-alkylacrylamide, methacrylamide, methyl acrylate, dimethyl maleate N-alkylmethacrylamide, N-(2-methylpropanesulfonic acid)acrylamide, N-(glycolic acid)acrylamide, N-[3-(propyl)trimethylammonium chloride]acrylamide, acrylonitrile, 2-(methacryloyloxy)ethyl]-trimethylammonium chloride, N-[3-(dimethylamino)propyl]methacrylamide, and N-ethylacrylamide.

8. The process according to claim 7, wherein vinylamine has a molecular weight ($M_w$) in the range of from about 100,000 to about 1,000,000 Daltons.

9. The process according to claim 7, wherein vinylamine ranges from about 1 to about 50% solids in the reaction medium.

10. The process according to claim 7, wherein the reaction medium comprises water or an organic solvent.

11. The process according to claim 10, wherein the dissolved vinylamine is reacted with the compound having at least one unsaturated bond conjugated to an electron-withdrawing group for a period of time from about 15 minutes to about 12 hours.

12. The process according to claim 7, wherein the compound having unsaturated bond conjugated to an electron-withdrawing group is selected from the group consisting of acrylamide, methacrylamide, methyl acrylate, dimethyl maleate.

13. Process of using Michael addition adduct of claim 1 as a dry strength resin for paper products.

14. Process of using the Michael addition adduct of claim 1 as a wet strength resin for paper products.

15. Process of using the Michael addition adduct of claim 1 as a creping adhesive.

16. Process of using the Michael addition adduct of claim 1 as an adhesive.

17. Process of using the Michael addition adduct of claim 1 as a drainage aid or retention aid for papermaking.

18. Process of using the Michael addition adduct of claim 1 as a flocculant for water treatment.

19. Process of using the Michael addition adduct of claim 1 as a coagulant for water treatment.

20. Process of using the Michael addition adduct of claim 1 as a deposit control agent for papermaking process and water treatment.

21. A Michael addition adduct comprising:
a copolymer or terpolymer of vinylamine reacted with a monomer having at least one unsaturated bond conjugated to an electron-withdrawing group wherein the monomer having at least one unsaturated bond conjugated to an electron withdrawing group is selected from the group consisting of acrylamide, N-alkylacrylamide, methacrylamide, N-alkylmethacrylamide, and acrylonitrile.

22. The process according to claim 12, wherein the compound having unsaturated bond conjugated to an electron-withdrawing group is selected from the group consisting of acrylamide and methacrylamide.

23. Process of using the Michael addition adduct produced by the process of claim 22 as a dry strength resin; a wet strength resin; a creping adhesive; a drainage aid or retention aid; or deposit control agent for papermaking process.

* * * * *